3,244,638
WATER-IN-OIL EMULSION
John T. Foley, Park Forest, Ill., and Russell H. Rogers, deceased, late of Palos Park, Ill., by Evelyn Rogers, executrix, Palos Park, Ill., assignors to Swift & Company, Chicago, Ill., a corporation of Illinois
No Drawing. Filed June 21, 1960, Ser. No. 37,799
11 Claims. (Cl. 252—308)

The present invention relates to emulsions. More specifically, this invention relates to emulsion compositions of the water-in-oil type, which remain stable at high temperatures and/or in the presence of electrolytes, and to the emulsifying compositions used therein.

Water-in-oil emulsions, that is, emulsions of the type wherein the continuous phase is a normally hydrophobic substance such as oil and the dispersed phase is water, have long been used as drilling fluids, fracturing fluids, hydraulic fluids, cutting oils, lubricants and so forth. In the early days of emulsion technology emulsions of the type herein contemplated were usually formed by mechanically agitating a mixture of the two or more mutually non-miscible components until interspersion was achieved. Subsequently, it was found the amount of agitation required to produce a stable water-oil emulsion could be materially reduced through the use of an emulsifying agent which served to promote the dispersion of one of the immiscible phases. The prior art describes many types of emulsifying agents which have been combined with various proportions of water and oil to promote the formation of emulsions that possess varying degrees of stability.

These prior art emulsion compositions containing various emulsifiers have been used with varying degrees of success for a great many applications, including those mentioned above and it has generally been found that satisfactory performance is obtained from most known water-in-oil emulsion compositions only under favorable circumstances or conditions of usage. Under extreme conditions of varying temperature and/or in the presence of contaminates such as finely dispersed inorganic material or strong electrolytes, emulsion compositions thus far developed have a tendency to break down, i.e., separate or invert to form an oil-in-water emulsion having a continuous water phase.

It is therefore one of the principal objects of this invention to provide a water-in-oil emulsion composition that will render satisfactory performance over a wide range of extreme operating conditions.

It is another object of this invention to provide a water-in-oil emulsion composition that will give satisfactory performance in the presence of a variety of electrolytes and concentrations thereof.

It is still a further object of this invention to provide a water-in-oil emulsion composition that will remain stable over a wide range of temperatures.

It is yet another object of this invention to provide an emulsifying composition that will readily combine with various proportions of water and oil to form a stable water-in-oil emulsion.

It is even another object of this invention to provide an emulsifying composition the use of which permits the formation of a stable water-in-oil emulsion with a minimum of agitation.

Various other objects of the invention will become apparent to those skilled in the art from the following detailed description.

Generally, the present invention relates to a water-in-oil emulsion composition which comprises an oil-water mixture and a relatively minor portion of a three component emulsifying composition that contains (1) an amine-fatty acid condensate, (2) a long chain aliphatic or fatty, monohydric alcohol, and (3) a coupling agent such as an oil soluble solvent.

More particularly, the invention contemplates a stable water-in-oil emulsion that contains from about one to about five parts by weight of a hydrophobic oil as the continuous phase, from about five to about nine parts by weight of water as the dispersed phase, and from about 1% to about 20% by weight based on the weight of the water and oil components present of a three component emulsifying composition which comprises a mixture of from about 1 to about 5 parts by weight of an amine-fatty acid condensate, from about ⅓, to about 2 parts by weight of a high molecular weight alcohol, and from about 0 to about 5 parts of an oil soluble solvent.

The oils that may be used to form the continuous phase of the present emulsions may be selected from the classes of hydrophobic susbtances generally known as hydrocarbons, for example paraffin type hydrocarbons or mineral oils. Specific examples of mineral oils to which the invention is particularly applicable include crude petroleum, fractions of crude petroleum known as light and heavy mineral oil, paraffin wax, kerosene, naphtha, and gasoline, residual oils, aromatic hydrocarbons and asphalt and coal tar derivatives having generally hydrophobic charcteristics.

The emulsifier composition utilized in forming the present emulsions contains a mixture of three ingredients which may be described as follows:

(1) An amine-fatty acid condensate which may be produced by reacting equal molar amounts of fatty acid and amine at temperatures ranging from about 120° C. to about 170° C. for a period sufficient to reduce the free amine content of the reaction mixture to below about 12% by weight. Such condensates are fully disclosed in U.S. Reissue Patent 21,530 to Kritchevsky. Generally, the fatty acids which are preferably used are those saturated or unsaturated aliphatic monocarboxylic acids having from about 8 to about 22 carbon atoms in the aliphatic chain and reactive esters and halides thereof. These acids may be conveniently obtained from any animal or vegetable fats. Specific examples of suitable monocarboxylic saturated fatty acids are capric, lauric, myristic, palmitic, stearic, and behenic acids. Suitable unsaturated fatty acids are monoethenoid acids, such as caproleic, lauroleic, myristoleic, palmitoleic, oleic, and cetoleic acids; diethanoid acids, such as linoleic acid; and triethenoid acids, such as linolenic acid. From a commercial standpoint mixtures of fatty acids derived from tallow, tall oil, soybean oil, coconut oil, and cottonseed oil have been found to be particularly suitable for the practice of this invention. The amine used in forming the condensate may be selected from those amines having at least one unsubstituted basic hydrogen atom attached to a nitrogen atom. Specific examples are mono- and dialkyl and alkanol amines having from 1 to 8 carbon atoms in the aliphatic portion as well as alkyl (preferably ethylene) polyamines having from two to about five amino groups per molecule. Specific examples of amines that may be used are mono- and dimethyl, ethyl, propyl, isopropyl, butyl amines, and mono- and dimethanol, ethanol, propanol, isopropanol, butanol amines. Polyamines such as ethylene diamine, diethylene triamine, triethylene tetramine, tetraethylene pentamine, and so forth, are also suitable. The condensate obtained from the above outlined procedure is believed to contain a mixture of amide, salt, and possibly ester type fatty acid derivatives, as well as a small amount of free amine which should not exceed about 12% by weight of the final reaction product.

(2) A long chain saturated or unsaturated monohydric aliphatic alcohol having from about 8 to about 22 carbon atoms in the aliphatic chain. Specific examples of suitable alcohols are decyl, lauryl, myristyl, cetyl, stearyl, behenyl, alcohols as well as oleyl and linoleyl alcohols and mixtures thereof.

(3) An oil solvent which acts as a coupling agent in that it promotes contact between the lipophilic phase of the emulsion and the primary components of the emulsifier composition, e.g., amine condensate and fatty alcohol. The coupling agent may be selected from those lower aliphatic monohydric alcohols having from about 3 to about 5 carbon atoms, water immiscible liquid chlorinated hydrocarbons, liquid aliphatic and aromatic hydrocarbons and mixtures thereof boiling in the range about 35° C.–220° C. and which exhibit fat solubilizing characteristics.

In general, to prepare the present emulsions, the three components comprising the emulsifier are thoroughly inter-mixed in the oil. Water is then added to the oil containing the emulsifier. Mild agitation accompanies these mixing operations and a stable water-in-oil emulsion is obtained.

The following examples, wherein all parts and percentages are by weight, illustrate specific embodiments of the present invention.

*Example I*

(a) One mole of methyl oleate was refluxed with one mole of diethanolamine under 26 in. Hg vacuum for 6 hours during which the temperature of the reaction mixture rose from 120° C. to 170° C. At the end of this period the reaction mixture contained about 12% unreacted diethanolamine.

(b) 63 parts of the condensation product obtained in (a) above was mixed with 18 parts of cetyl alcohol and 19 parts isopropyl alcohol. 4 g. of this mixture, when mildly agitated with 96 g. of mixtures comprised of crude petroleum containing from 75 to 90% water, formed a very stable water-in-oil emulsion.

(c) 63 parts of the condensate prepared in (a) above was mixed with 18 parts of cetyl alcohol. This composition, in which the solubilizing agent was omitted, was found to be somewhat slower acting than the composition defined in I(b) above and required about 50% more emulsifier to form emulsions that were as stable as those prepared from the composition defined in (b).

*Example II*

(a) One mole of tallow (triglyceride) was heated with 6 moles of diethanolamine under 26 in. Hg vacuum for 5 hours during which time the temperature ranged from 120° C. to 170° C. At the end of 5 hours the mixture of tallow fatty acid, diethanolamine condensate and free diethanolamine was cooled and dissolved in chloroform. The free diethanolamine was precipitated from the chloroform solution by reaction with sulfuric acid and the solution of condensate was decanted and the chloroform was removed by evaporation.

(b) 63 parts of the condensation product obtained in (a) was mixed with 18 parts of cetyl alcohol and 19 parts of isopropanol. 2 g. of this mixture was thoroughly mixed with 98 g. of a mixture containing 1 part diesel oil and 9 parts water. A very stable emulsion having a continuous oil phase resulted.

(c) 63 parts of the condensation product obtained in (a) was mixed with 18 parts of cetyl alcohol. 6 g. of this mixture when added to 94 g. of mixtures composed of diesel oil and water, wherein the ratio of oil and water varied from 3 to 7 up to 1 to 9 respectively, was found to promote the formation of a stable emulsion.

*Example III*

(e) One mole of coconut oil fatty acid was heated with one mole of diethanolamine under 26 in. Hg of vacuum for 6 hours during which the temperature of the reaction rose from 120° C. to 170° C. At the end of this period the reaction mixture contained about 12% unreacted diethanolamine.

(b) 70 parts of the condensation product obtained in (a) above was mixed with 15 parts of cetyl alcohol and 15 parts of toluol. 3 g. of this mixture was added to 97 g. of a mixture containing 1 part mixed mineral oils and 8 parts saturated salt water. The mixture was mildly agitated wherein a stable emulsion formed.

(c) 60 parts of the condensation product obtained in (a) above was mixed with 20 parts of cetyl alcohol and 20 parts of carbon tetrachloride. 3 g. of this mixture completely emulsified 97 g. of mixtures of mineral oil and water, wherein the water comprised from 50 to 90% of the mixture.

*Example IV*

(a) One mole of behenic acid was heated with one mole of monoethanolamine under 26 in. of Hg vacuum for 6 hours during which the temperature of the reaction rose from 120° C. to 170° C. At the end of this period the reaction mixture contained about 12% unreacted monoethanolamine.

(b) 60 parts of the condensation product obtained in (a) above was mixed with 20 parts of tout oil and 20 parts of perchloroethylene. 2 g. of this mixture when combined with 98 g. of a mixture comprising ½ part mineral oil and 9½ parts of 36% hydrochloric acid solution formed a very stable emulsion.

(c) 60 parts of the condensation product obtained in (a) above was mixed with 20 parts of cetyl alcohol and 20 parts of gasoline. 3 g. of the resulting mixture when mixed with 97 g. of a mixture comprised of 1 part mineral oil and 9 parts water formed a stable emulsion.

*Example V*

(a) One mole of red oil was heated with one mole of diethanolamine in an evacuated vessel for one hour during which the temperature was maintained between 100–110° C. After one hour at 100–110° C. the temperature of the mixture was raised to 135° C. and the vacuum was increased to 26 in. Hg. The temperature was maintained between 130–140° C. for 12 hours at the end of which the reaction product contained about 12% free diethanolamine. The reaction product exhibited no crystallization upon aging, as do similar products heated to higher temperatures and condensed in shorter periods of time.

(b) 75 parts of the reaction product obtained in (a) above were mixed with 25 parts of cetyl alcohol. 1.5 g. of the resulting mixture when added to 98.5 g. of a mixture containing 1 part mineral oil and 1 part 20% sodium hydroxide-water solution promoted the formation of a stable water-in-oil emulsion.

*Example VI*

(a) One mole of red oil was heated with one mole of tetraethylene pentamine under 26 in. Hg vacuum at temperatures in excess of 100° C. for five hours.

(b) 30 parts of the product obtained in (a) above was mixed with 70 parts of the product obtained in Example V. 1 g. of the mixture when combined with 99 g. of a mixture containing mineral oil and from 60 to 90% water and up to 25% weighting material (barium sulfate), was found to produce a very satisfactory drilling mud.

(c) 20 parts of the condensate obtained in (a) above was mixed with 60 parts of the condensate obtained in Example V above and 20 parts of cetyl alcohol. 5 g. of the resulting mixture was found to be effective in emulsifying 95 g. of mineral oil containing from 60 to 90% of a saturated zinc chloride solution.

Example VII (a) 470 parts of red oil was reacted with 175 parts of diethanolamine for 4 hours under a vacuum of 26 in. Hg during which time the temperature rose from 140° C. to 170° C. The reaction mixture was cooled to 130° C. and 124 parts of methyl oleate was added. The reaction was continued for 3 hours at 130° C.

(b) 60 parts of the above product was mixed with 15 parts of cetyl alcohol and 25 parts chloroform. 3 g. of this composition effectively emulsified 97 g. of a mineral oil composition which contained 83% saturated salt water.

(c) 40 parts of the above product was mixed with 10 parts of cetyl alcohol and 50 parts of chloroform. From 3 g. to 5 g. of the resulting mixture was found to effectively emulsify 95 g. to 97 g. of mixtures of either ethylene dichloride, chlorobenzene, P-dichlorobenzene, or O-dichlorobenzene which contained from 70% to 90% of a saturated calcium chloride solution.

Example VIII (a) Two moles of stearic acid were heated with one mole diethylene triamine under 26 in. Hg vacuum for 5 hours during which the temperature rose above 100° C.

(b) 80 parts of the product obtained in Example I(a) were mixed with 20 parts of the reaction product of Example VIII(a) above. 5 g. of the mixture formed stable emulsions when agitated with 95 g. of a mineral oil composition containing 60 to 90% salt water which was contaminated with up to 5% clay.

Example IX (a) One mole of red oil and one mole of triethylene tetramine were dissolved in benzene and the solution was heated until one mole of water had been formed in the reaction. The solvent was removed by distillation.

(b) 60 parts of the reaction product from Example IV(a) were mixed with 20 parts of the reaction product from (a) above, and 20 parts of xylene. 4 g. of the resulting mixture was mixed with 96 g. of a mixture comprising 1 part mineral oil and 9 parts of a 25% sodium silicate solution. A stable emulsion having a continuous oil phase was formed.

The emulsions prepared in the preceding examples and herein contemplated have many uses, among them being drilling fluids, fracturing fluids, completion and workover fluids, emulsions for blocking water influx, hydraulic fluids, cutting oils, lubricating fluids, emulsions for acid, or caustic, or electrolyte transport, and cleaning fluids.

Obviously many modifications and variations of the invention as hereinbefore set forth may be made without departing from the spirit and scope thereof and therefore only such limitations should be imposed as are indicated in the appended claims.

What is claimed is:

1. A water-in-oil emulsion comprising water, mineral oil, and from about 1% to about 20% of an emulsifying composition comprising (1) about 1 to about 5 parts by weight of the condensation product of an amine, selected from the group consisting of mono- and dialkyl, mono- and dialkanol amines, said alkyl and alkanol amines having from 1 to 8 carbon atoms in the alkyl and alkanol chains, alkyl polyamines selected from the group consisting of ethylene diamine, diethylene triamine, triethylene tetramine and tetraethylene pentamine, and mixtures thereof, with about an equal molar amount of a fatty acid chosen from the group consisting of aliphatic monocarboxylic acids having from 8 to 22 carbon atoms in the aliphatic chain, and reactive esters and halides thereof; (2) about ⅓ to about 2 parts by weight of an aliphatic monohydric alcohol having from 8 to 22 carbon atoms in the aliphatic chain; and (3) about 0 to about 5 parts by weight of a coupling agent selected from the group consisting of aliphatic monohydric alcohols having from about 3 to about 5 carbon atoms in the aliphatic chain, water immiscible liquid chlorinated hydrocarbons, and low boiling liquid aliphatic and aromatic hydrocarbons having fat solubilizing properties and mixtures thereof.

2. A water-in-oil emulsion comprising from about 5 to about 9 parts by weight of water dispersed in from about 1 to about 5 parts by weight of mineral oil and from about 1% to about 20% of an emulsifier composition which comprises (1) about 1 to about 5 parts by weight of the condensation product of an amine, selected from the group consisting of mono- and dialkyl, mono- and dialkanol amines, said alkyl and alkanol amines having from 1 to 8 carbon atoms in the alkyl and alkanol chains, alkyl polyamines selected from the group consisting of ethylene diamine, diethylene triamine, triethylene tetramine and tetraethylene pentamine, and mixtures thereof, with about an equal molar amount of a fatty acid chosen from the group consisting of aliphatic monocarboxylic acids having from 8 to 22 carbon atoms in the aliphatic chain and reactive esters and halides thereof; (2) about ⅓ to about 2 parts by weight of a long chain aliphatic monohydric alcohol having from 8 to 22 carbon atoms in the aliphatic chain; and (3) about 0 to about 5 parts by weight of a coupling agent selected from the group consisting of aliphatic monohydric alcohols having from about 3 to about 5 carbon atoms in the aliphatic chain, water immiscible liquid chlorinated hydrocarbons, and low boiling liquid aliphatic and aromatic hydrocarbons having fat solubilizing properties and mixtures thereof.

3. The emulsion of claim 2 wherein the emulsifying composition is present in an amount of from about 1% to about 20% by weight based on the combined weight of the water and oil components present.

4. The emulsion of claim 2 wherein the amine is a dialkanol amine having from 1 to 8 carbon atoms in the alkanol chain.

5. The emulsion of claim 2 wherein the amine is diethanol amine.

6. The emulsion of claim 2 wherein the long chain aliphatic monohydric alcohol is cetyl alcohol.

7. The emulsion of claim 2 wherein the coupling agent is an aliphatic monohydric alcohol having from about 3 to about 5 carbon atoms in the aliphatic chain.

8. An emulsifying composition comprising (1) from about 1 to about 5 parts by weight of the condensation product of an amine, selected from the group consisting of mono- and dialkyl, mono- and dialkanol amines, said alkyl and alkanol amines having from 1 to 8 carbon atoms in the alkyl and alkanol chains, alkyl polyamines selected from the group consisting of ethylene diamine, diethylene triamine, triethylene tetramine and tetraethylene pentamine, and mixtures thereof, with about an equal molar amount of a fatty acid chosen from the group consisting of aliphatic monocarboxylic acids having from 8 to 22 carbon atoms in the aliphatic chain and reactive esters and halides thereof; (2) about ⅓ to about 2 parts by weight of an aliphatic monohydric alcohol having from 8 to 22 carbon atoms in the aliphatic chain;

and (3) about 0 to about 5 parts by weight of a coupling agent selected from the group consisting of aliphatic monohydric alcohols having from about 3 to about 5 carbon atoms in the aliphatic chain, water immiscible liquid chlorinated hydrocarbons, and low boiling liquid aliphatic and aromatic hydrocarbons having fat solubilizing properties and mixtures thereof.

9. The emulsifying composition of claim 8 wherein the amine is a dialkanol amine having from 1 to 8 carbon atoms in the alkanol chain.

10. The composition of claim 8 wherein the coupling agent is an aliphatic monohydric alcohol having from about 3 to about 5 carbon atoms in the aliphatic chain.

11. The emulsifying composition of claim 8 wherein the coupling agent is a water immiscible liquid chlorinated hydrocarbon having fat solubilizing properties.

References Cited by the Examiner
UNITED STATES PATENTS

| | | | |
|---|---|---|---|
| 2,089,212 | 8/1937 | Kritchevsky | 252—357 XR |
| 2,356,205 | 8/1944 | Blair | 252—8.55 |
| 2,617,754 | 11/1952 | Neely | 252—308 XR |
| 2,946,746 | 7/1960 | Keller | 252—357 XR |
| 3,044,959 | 7/1962 | Martin | 252—8.55 |

OTHER REFERENCES

Schwartz et al.: "Surface Active Agents," Interscience Publishers, Inc. (1949), page 214.

JULIUS GREENWALD, *Primary Examiner.*

ALBERT T. MEYERS, *Examiner.*

K. W. VERNON, *Assistant Examiner.*